No. 813,213. PATENTED FEB. 20, 1906.
W. S. JOHNSON.
MOTOR PROPELLED VEHICLE.
APPLICATION FILED NOV. 10, 1904.

No. 813,213. PATENTED FEB. 20, 1906.
W. S. JOHNSON.
MOTOR PROPELLED VEHICLE.
APPLICATION FILED NOV. 10, 1904.

No. 813,213. PATENTED FEB. 20, 1906.
W. S. JOHNSON.
MOTOR PROPELLED VEHICLE.
APPLICATION FILED NOV. 10, 1904.

Witnesses
J. Stewart Rice.
Fannie Wise

Inventor:
Warren S. Johnson,
By Dodge and Sons,
Attorneys

No. 813,213. PATENTED FEB. 20, 1906.
W. S. JOHNSON.
MOTOR PROPELLED VEHICLE.
APPLICATION FILED NOV. 10, 1904.

Witnesses
J. Stewart Rice
Fannie Hill

Inventor:
Warren S. Johnson,
By Dodge and Sons,
Attorneys.

No. 813,213. PATENTED FEB. 20, 1906.
W. S. JOHNSON.
MOTOR PROPELLED VEHICLE.
APPLICATION FILED NOV. 10, 1904.

UNITED STATES PATENT OFFICE.

WARREN S. JOHNSON, OF MILWAUKEE, WISCONSIN.

MOTOR-PROPELLED VEHICLE.

No. 813,213.

Specification of Letters Patent.

Patented Feb. 20, 1906.

Application filed November 10, 1904. Serial No. 232,165.

*To all whom it may concern:*

Be it known that I, WARREN S. JOHNSON, a citizen of the United States, residing at Milwaukee, in the county of Milwaukee and State of Wisconsin, have invented certain new and useful Improvements in Motor-Propelled Vehicles, of which the following is a specification.

My invention pertains to power-propelled vehicles, and is designed to afford convenient means and adequate power for steering or turning heavy vehicles—such as warehouse-trucks, vans, and large passenger-vehicles—quickly, certainly, and in small space.

The invention is intended more particularly for that class of vehicles in which the motor is carried by a forward truck to the wheels of which the power is applied and which is connected with the body of the vehicle by a turn-table or fifth-wheel.

Between the engine or motor and the ground-wheels, to which the power is applied, there is interposed differential gear through which the two wheels may be driven simultaneously and equally or either wheel alone or the two wheels at different speeds. In connection with the parts already indicated there is employed means for holding or retarding either wheel at will and means for locking the turn-table when desired against rotation relatively to the vehicle-body. By holding one wheel and driving the other the driven or the more rapidly driven wheel can be made to travel or circle about the other, and thus to turn or direct the vehicle as desired.

The accompanying drawings illustrate the invention in two forms or embodiments, the first having a divided main axle to which the power is directly applied and the other employing a divided counter-shaft through which power is transmitted from the motor to the ground-wheels. In practice the latter construction will ordinarily be adopted, particularly for heavy vehicles; but the first form is perhaps more readily understood and is illustrated primarily for that reason.

In said drawings.

Heavy motor-propelled vehicles require the application of considerable power to control and direct their movements, and it is essential, particularly in crowded thoroughfares, narrow lanes, streets, or alleys, and like places that adequate power be always at hand and available for such purposes. It is likewise highly important that the vehicle be capable of turning in small space, backing, or pursuing a winding course among other vehicles and past obstructions. The present invention is primarily intended to meet and fulfil these conditions and requirements and in practical use is found to do so in an eminent degree.

Figures 1, 3:
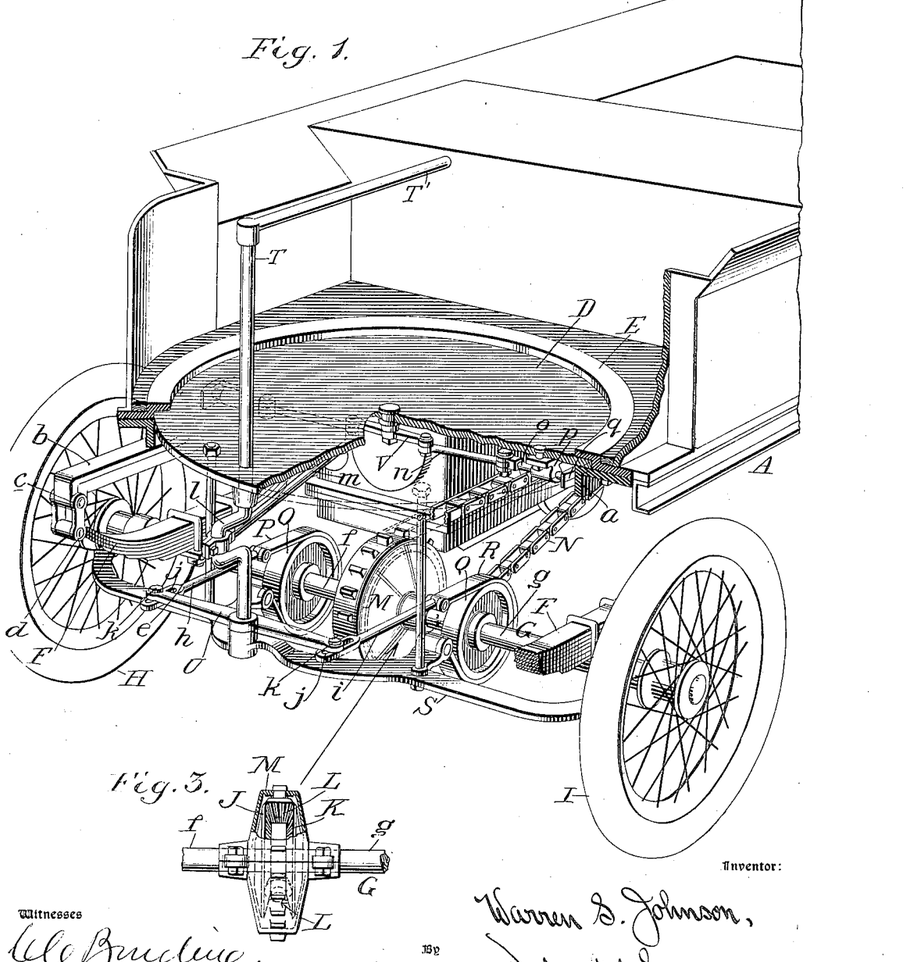
Figure 1 is a perspective view of a vehicle embodying my invention, portions being broken away and others wholly omitted to show more clearly those parts material to the ensuing description.
Fig. 3, a partly-sectional view of the differential-gear box used with this embodiment of the invention.
Figure 2:
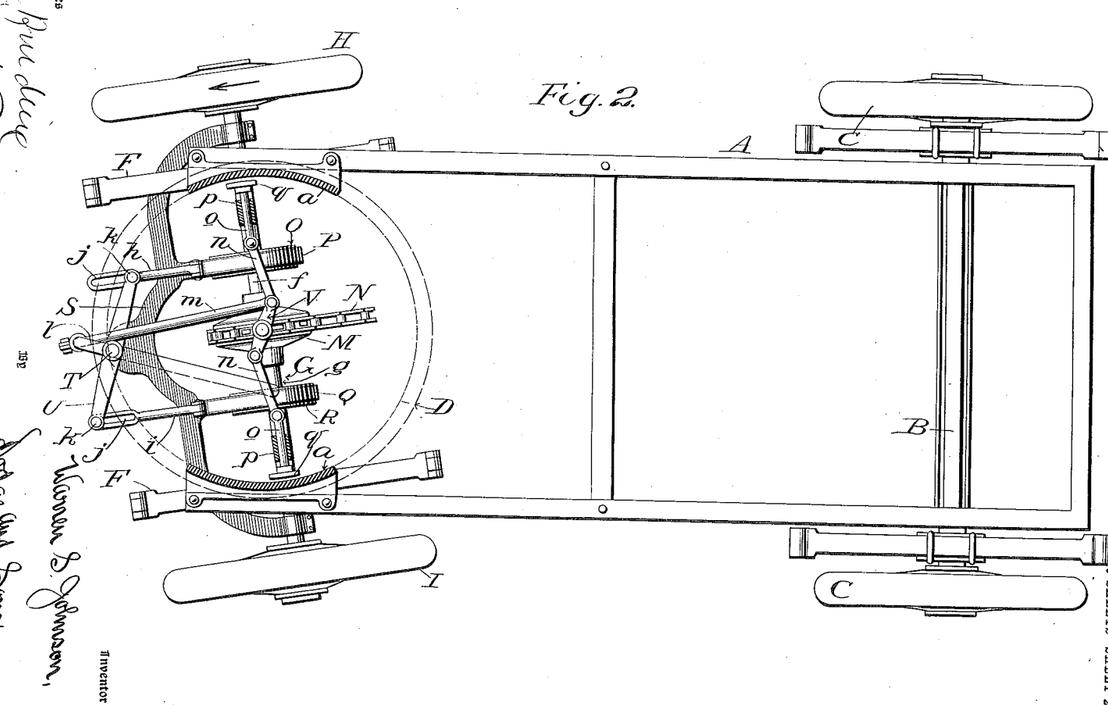
Fig. 2, a horizontal sectional view taken just below the turn-table and looking down upon the parts beneath it.

With this statement of the purposes of the invention I will proceed to describe it as embodied in working form, referring first to Figs. 1, 2, and 3.

A indicates a vehicle-body of any desired type or pattern, the rear end of which is provided with an axle B and ground-wheels C after the manner of an ordinary wagon, springs being employed or not, as preferred.

D indicates a turn-table or large fifth-wheel constituting the platform of a forward truck. This turn-table has its periphery seated in an annular guide or supporting ring E, bolted or otherwise firmly secured to the floor of the vehicle-body, said guide or ring being formed or furnished with a depending flange or rim *a*, as seen in Fig. 1, against which bear clamping-shoes of a clutch or locking mechanism designed to hold the turn-table at proper times against rotation within its supporting-ring E.

The turn-table is formed or provided with arms *b*, having depending eyes *c* to receive bolts *d*, on which are hung links carrying the ends of springs F, here represented as of the leaf construction common to heavy-wheeled vehicles, though other forms of spring may be employed if desired or they may be wholly omitted. The springs are provided with boxes or bearings e, in which are carried and rotate the two sections f and g of a divided front axle G, respectively furnished with ground-wheels H and I, made fast thereon, as is sometimes done with the power-receiving axle of motor-vehicles.

The proximate ends of the axle-sections are connected by differential gearing of any common or approved type, here represented as comprising two bevel-gears J and K, carried, respectively, by the two axle-sections and connected by interposed pinions L, carried by a ring, hoop, or shell M, encircling the gears J K, said pinions being rotatable upon journals or axles carried by the shell and arranged radially to the axis of the front axle G. The circumference of the hoop or ring M is represented as provided with teeth or sprockets to receive a driving-chain N, through which power is transmitted from any suitable motor carried by the forward truck or its turn-table; but it may have gear-teeth to mesh with a driving-gear or be smooth to receive a driving-belt or be driven by a friction-wheel.

Axle-section f is provided with a wheel or drum O to receive a brake-band P, and section g is similarly provided with a wheel or dum Q to receive a brake-band R. One end of each brake-band is made fast to a cross-bar S or other rigid portion of the forward truck, while the other end of each is furnished with a draw-rod. These rods are designated as h and i, respectively, and each is formed with a slot j in its outer end portion, as seen in Figs. 1 and 2.

T indicates a vertical shaft suitably supported in the turn-table or in a tubular post or standard carried thereby, the lower extremity being advisably mounted in a second support to prevent its springing in use. At or near its lower end the shaft T carries a cross-bar U, which at its outer ends carries pins or bolts k, which enter or pass through the slots j of the draw-rods h and i, respectively.

The slots j are of such length that when the cross-bar U is perpendicular to the length or the normal line of movement of the vehicle the pins or bolts k are a little away from the forward ends of said slots, thus leaving the brake-bands P and R free to spring and to stand normally away from their respective wheels or drums. These bands may be made of steel or other metal possessing a suitable degree of resilience and of strength, and it will be found advisable to face or line them with leather or like material, as is usually done with such bands.

Shaft T is bent to form a crank l at a point below the turn-table, which crank is connected by a link or rod m with a pin or bolt carried by one arm of an oscillating bar V, fulcrumed midway between its ends at a point coincident with the center of the turn-table, or thereabout. Each arm of the bar V is in turn connected by a link or rod n with a radially-movable rod o, supported and guided in a block p on the under side of the turn-table, and each rod o carries a shoe or friction-plate q to bear against the depending rim a of the guide-ring E. The purpose of this arrangement is to cause the turn-table to be locked or held against turning within or relatively to the ring E whenever the steering-lever T' of shaft T is in its normal or medial position. If said lever be swung from said normal medial position a distance sufficient to tighten either brake-band P or R upon its drum or wheel, the turn-table will be unlocked or made free and the vehicle may be bodily turned in the desired direction.

It will be noticed that as the bar U draws upon one rod h its opposite end merely carries its pin or bolt k backward in the slot j of the other draw-rod, and hence exerts no influence thereon.

The mechanism being thus constructed its operation will be as follows: Assuming that it be desired to turn the vehicle to the left, the steering handle or lever is swung to the left, thereby unlocking or unclamping the turn-table and simultaneously tightening the left-hand brake-band R, so as to hold the axle-section g and wheel I against rotation or to retard its rotation, as desired. Bevel-gear K being fast upon said axle-section will also be held, and consequently the pinions L carried around by the hoop or ring M will travel over said wheel K and give motion to bevel-gear J, which being fast upon axle-section f will turn said section and the ground-wheel H. This will cause the wheel H to travel in a circular path, of which the bearing-point of wheel I upon the ground is the center, and the vehicle-body will thus be carried to the left until the wheel H describes a half-circle, unless before that time the lever T' is moved to release the brake-drum Q. When such release is effected, the two axle-sections will rotate alike and the wheels H and I will advance equally, the body of the vehicle promptly straightening or trailing, so as to bring the rear wheels into alinement with said wheels H and I. If it be desired to turn to the right, the lever T' is swung in that direction, and the right-hand section of the axle and wheels H and I will be held, the action being the same as before, but with the right-hand groups of parts instead of the left-hand. By holding either wheel and continuing the other in motion the latter can be made to describe a complete circle about the former and to continue so doing, the vehicle-body moving slightly forward and backward and swinging from side to side at the forward end. When running in a straight line, the brake-bands are released, the turn-table is clamped or locked, and the vehicle acts as any ordinary wheeled vehicle might do. It will be observed that the entire driving power is in this way made available at any instant to effect a steering and control of the vehicle, the steering being effected through the propelling-wheels.

Figure 4:
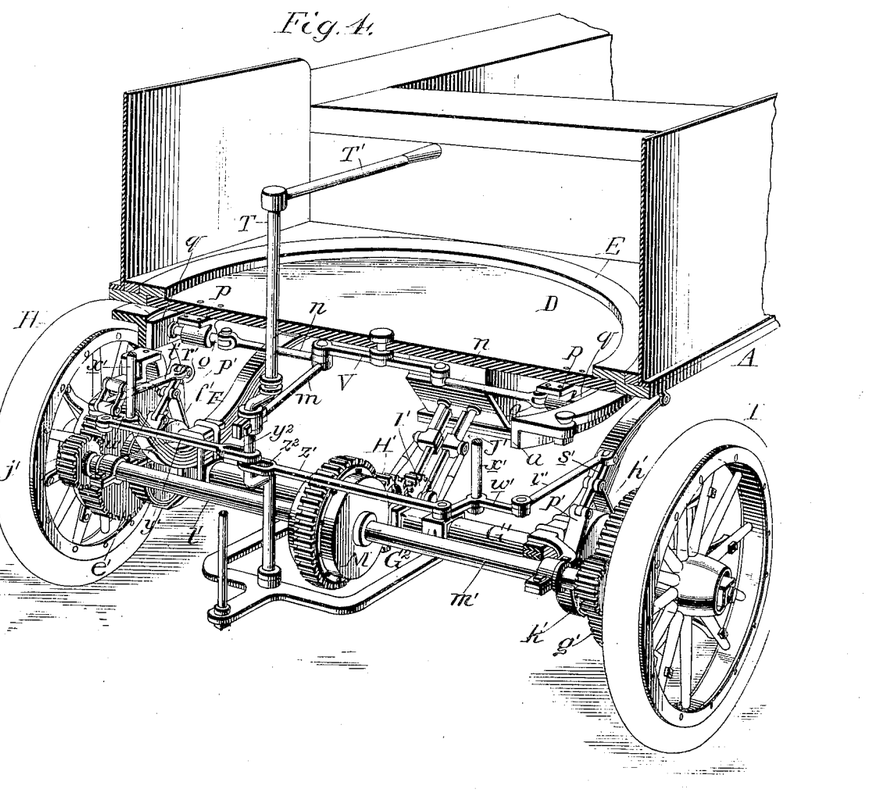
Fig. 4, a perspective view of the mechanism in its preferred form or with a counter-shaft interposed between the motor and the ground-wheels.
Figure 5:
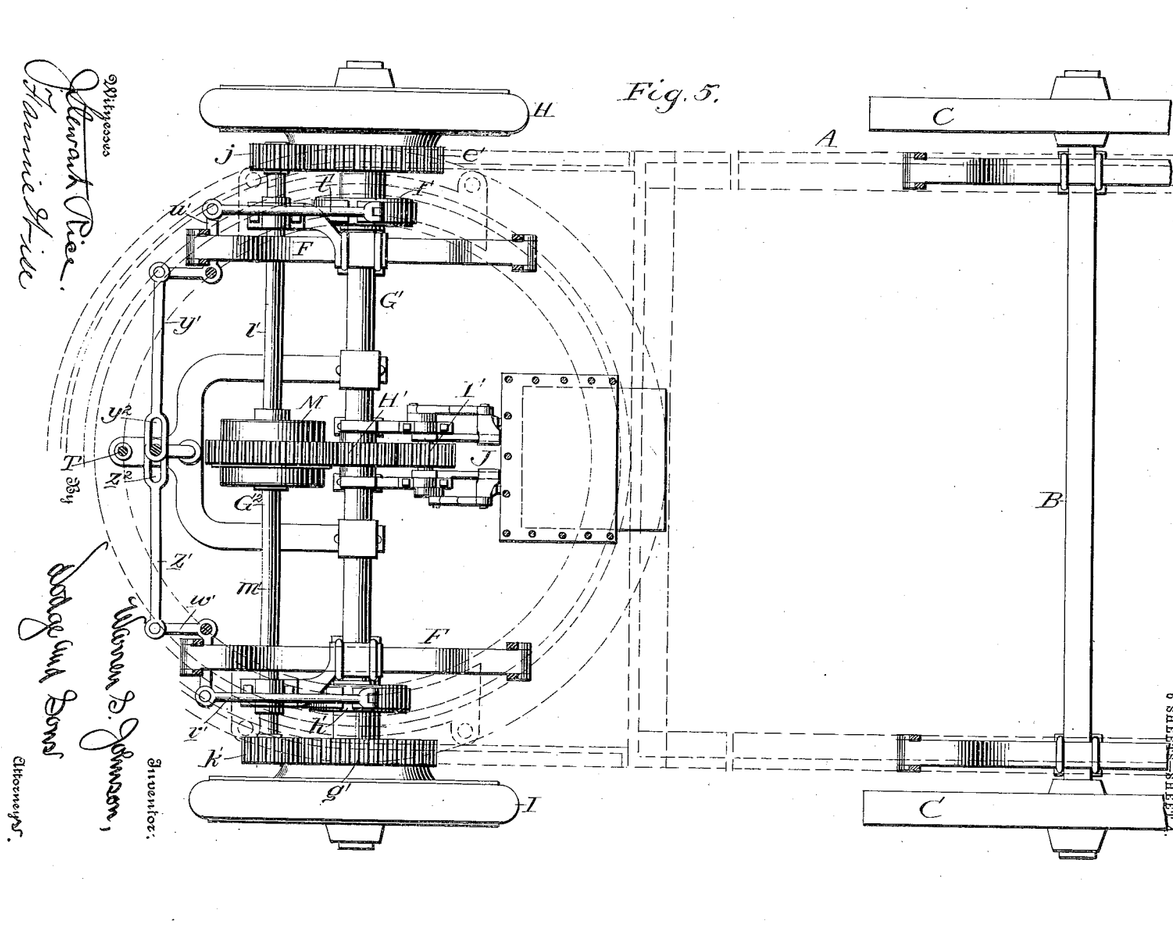
Fig. 5, a top plan view of the mechanism below the turn-table and wagon-body, the body of the vehicle being indicated by dotted lines.
Figure 6:
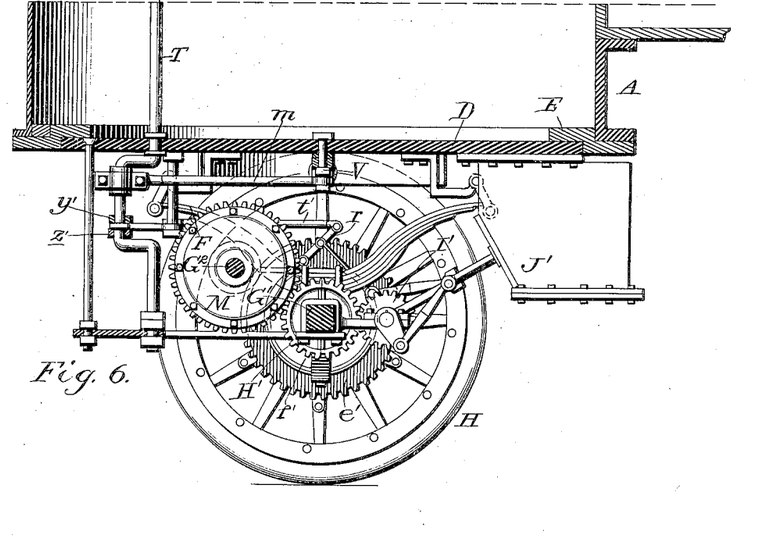
Fig. 6, a vertical section from front to rear on the line 6 6 of Fig. 5.
Figure 9:
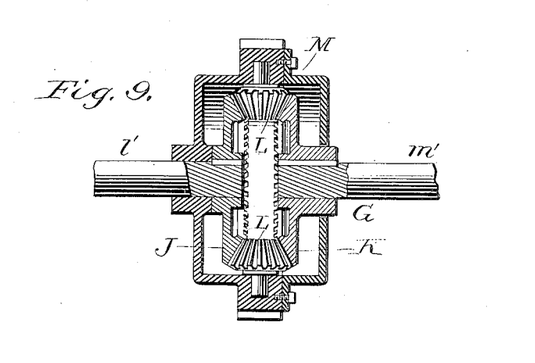
Fig. 9, a sectional view of the differential-gear casing in a slightly-different form from that shown in Fig. 3.

In practice it is desirable, because economical of fuel and water and involving comparatively small weight of machinery, boiler, &c., to employ a comparatively small motor and to gear up to the driving-wheels to secure the requisite power. This is especially true where the vehicle is intended for hauling or carrying heavy loads. I therefore usually interpose between the motor and the ground-wheels a divided intermediate or counter-shaft and apply the differential gearing thereto, as will now be explained in connection with Figs. 4 to 9, inclusive. In these figures all parts identical in construction and arrangement with corresponding parts of the preceding figures are lettered the same. Thus A is the body of the vehicle; B, the rear axle, provided with ground-wheels C; D, a turn-table supported and turning in a ring or annular guide E, provided with a depending flange or clamping-surface $a$; F F, springs connected by links and bolts or pins $c$ and $d$ with bracket-arms $b$ of the turn-table, and G' a front axle upon and by which said springs are supported. In the present instance the front axle G' is a fixed or non-rotating axle in one piece, and the wheels H and I are free to rotate upon its spindles after the manner of ordinary wagon-wheels. Wheel H is provided with a gear-wheel $e'$ and brake-wheel $f'$, which may be made integral or separate, as found convenient, being here represented as carried by a common sleeve and connected with wheel H by bracket-arms bolted thereto. Similarly, wheel I is furnished with a gear-wheel $g'$ and brake-wheel $h'$, both rigidly connected with said wheel I, as indicated. Rotary motion is imparted to wheels H and I through pinions $j'$ and $k'$, carried by sections $l'$ and $m'$ of a divided or two-part counter-shaft $G^2$. Shaft-section $l'$ is provided with a bevel-gear J, and section $m'$ with a like gear K, and between these gears are bevel-pinions L, having axles carried by a shell or casing M, swiveled upon the shaft $G^2$, as shown in Fig. 9. Upon the periphery of shell M are formed gear-teeth, as seen in Figs. 4, 5, and 6, designed to mesh with the teeth of an idler-pinion H', loosely mounted upon the axle G', and in turn meshing with and rotated by a pinion I' of any suitable motor J', carried by the turn-table D. The outer end of shaft-section $l'$ carries a pinion $n'$, which meshes with gear $e'$ of wheel H, and the outer end of shaft-section $m'$ carries a pinion $o'$, which meshes with gear $f'$ of wheel I.

Figure 7:
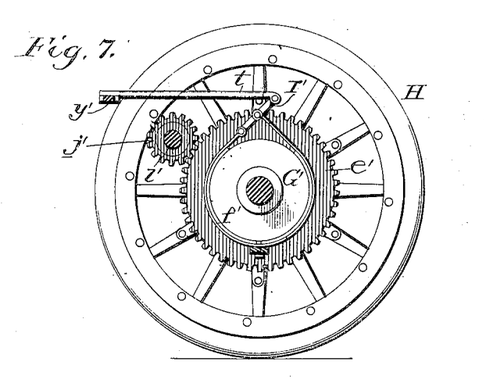
Fig. 7, a view of one of the brakes or wheel-holding bands.
Figure 8:
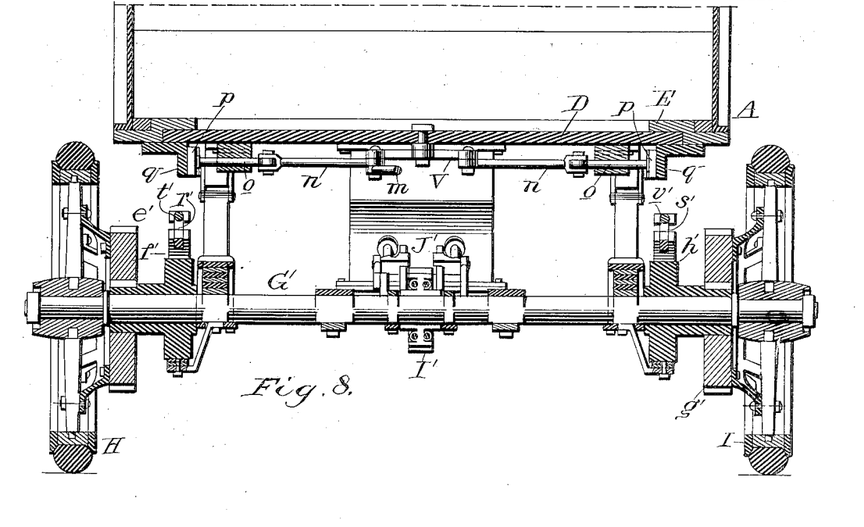
Fig. 8, a vertical section along the line of and parallel with the main axle.

A steering handle or lever T', carried by a vertical cranked shaft T, is employed to steer the vehicle, as in the first-described embodiment of the invention. The crank of said shaft is connected by a rod $m$ with one arm of a cross bar or lever V, both arms of which are connected by links $n$ with rods or stems $o$, sliding through blocks or guides $p$ and carrying shoes $q$, which when the lever T' is in its normal or medial position bear against depending rim or flange $a$ and lock the turn-table rigidly to the vehicle-body. This mechanism being unchanged need not be further described. Lever T' serves also to apply the brake bands or straps by which the wheels H I are held or retarded one at a time. To accomplish this result, I provide for the brake wheel or hub $f'$ a band or strap $p'$ and for brake wheel or hub $h'$ a band or strap $q'$, each made fast at a point between its ends to a fixed support, which may conveniently be a bracket held by the bolts or yokes which clamp the spring to the axle. Brake band or strap $p'$ has its extremities connected, respectively, to one end and at the mid-length of a lever $r'$, and band $q'$ has its ends similarly attached to a lever $s'$. Lever $r'$ is connected by a rod $t'$ to one arm of an elbow-lever $u'$, and lever $s'$ is connected by a rod $v'$ to one arm of an elbow-lever $w'$, which levers are fulcrumed upon suitable fixed supports, here represented as vertical rods $x'$, extending down from the turn-table D, but which may obviously be any convenient fixture.

From the second arm of lever $u'$ a draw-rod $y'$ extends to the cranked portion of crank-shaft T, its end being formed with an elongated eye or opening $y^2$ to receive the crank, and in like manner the second end of elbow-lever $w'$ is connected by a rod $z'$ with the cranked portion of shaft T, said rod having an elongated eye or opening $z^2$ for the crank, all as shown in Figs. 4 and 5.

When steering-handle T' is in its normal medial position, the crank stands at or near the end of each eye $y^2$ $z^2$, the brake-bands being then expanded and exerting no pressure upon their hubs. If now the steering-lever be moved to one side to cause the vehicle to turn in that direction, the cranked portion of shaft T will draw upon one of the rods $y'$ or $z'$, as the case may be, but will merely traverse the eye or slot of the other rod, and hence will tighten one band and leave the other unaffected. This will take place whichever way the lever is swung, but drawing upon first one and then the other rod as the lever is moved to one or the other side of its normal position. The effect is precisely the same as before explained, the ground-wheel H or I being held fast or retarded and, through the gearing, holding the section of the counter-shaft associated therewith. As the shaft-section, and consequently the bevel-gear upon it, is held, said gear becomes, in effect, a fixed or slowly-moving rack upon which the bevel-pinions of the differential gear travel, thereby imparting more rapid motion to the gear of the other shaft-section and its associated ground-wheel, causing the latter to circle about the held or retarded wheel, as explained. By moving the lever to one or the other side the forward truck can be made to turn as desired, the body of the vehicle trailing after the truck and coming into line, whereupon the turn-table will be locked or clamped until further turning is required.

It is particularly to be noted that under my construction the power of the motor is applied through suitable gearing to the forward wheels and that in turning one or the other wheel (or both) will be positively driven or rotated and one caused to circle about its companion, which either stands at rest or turns more slowly and describes a smaller circle. It is likewise to be noted that the forward truck thus affords a support and a draft device for the body of the vehicle (which trails after it) and constitutes the steering mechanism.

Having thus described my invention, what I claim is—

1. In combination with the body of a vehicle, a turn-table; a divided driving-shaft carried by said turn-table; a motor for imparting rotation to said shaft; differential gear interposed between the motor and the shaft-sections; ground-wheels connected with the respective shaft-sections; and means whereby either wheel may be temporarily held against rotation while the other is left free to turn.

2. In a vehicle, the combination of a motor and a divided driving-shaft; differential gear connecting the motor with the shaft-sections; ground-wheels connected with and driven by said sections; and brakes or holding devices, one for each of said wheels, each adapted to hold its wheel against rotation or to retard such rotation.

3. In combination with a vehicle, comprising a body, having rear wheels to rest normally upon the ground, and a front swiveled truck provided with a divided driving-shaft; a motor for rotating said shaft; ground-wheels connected with and rotated by the respective sections of said shaft; and means substantially such as described for holding against rotation either ground-wheel while permitting the other to rotate under the power of the motor.

4. In combination with the body of a vehicle provided with rear wheels to rest normally on the ground and support the vehicle, a turn-table mounted in and adapted to turn relatively to the vehicle-body; a divided shaft carried by said turn-table; a motor for rotating said shaft; ground-wheels connected with and adapted to be rotated by the respective sections of said shaft; brakes or holding devices serving to hold against rotation the driven ground-wheels; clamping or holding devices adapted to hold the turn-table against rotation; and intermediate connections substantially such as described, between the locking or holding devices of the turn-table and the brakes or clamping devices of the wheels, whereby when the turn-table is locked or clamped, the brakes are released, and when either brake is applied the turn-table is released.

5. In combination with a divided driving-shaft, and ground-wheels of a motor-vehicle connected with and rotated by the respective sections of said shaft, brakes or holding devices, one for each of said wheels; a motor for rotating the shaft; differential gear interposed between the motor and said shaft; an operating-lever for the brakes or holding devices; and connections between said lever and brakes or holding devices, whereby when the lever is in its medial position both brakes are made free, and whereby, when the lever is thrown in direction to apply either brake, it is precluded from also applying the other brake.

6. In combination with the body A of a vehicle, an annular support E carried thereby; a turn-table D rotatably mounted in said annular support; an axle carried by the turn-table; ground-wheels mounted upon said axle; braking or clamping shoes q carried by the turn-table and adapted to press against the support E; a lever; connections between said lever and the shoes q, whereby the latter may be forced into or withdrawn from frictional contact with the support E; a motor; and connections between the motor and the ground-wheels whereby either or both of said wheels may be positively driven by the motor.

7. In a vehicle, the combination with the body of the turn-table D and its supporting-ring E; outwardly-movable rods o, provided with shoes q to bear against the support E; a cross-head V pivotally attached to the turn-table D; rods n connecting said cross-head with the rods o; a crank-shaft T provided with a steering handle or lever; and rods m connecting the cranked portion of said shaft with the cross-head V.

8. In combination with the body of a vehicle, a ring or annular support E carried thereby; a turn-table D rotatable in said support; a divided shaft carried by said turn-table; ground-wheels supporting said turn-table; connections between said ground-wheels and the respective shaft-sections, whereby the wheels are driven; a motor; differential gear connecting the motor with the shaft-sections; brakes or holding devices serving to hold or retard the respective ground-wheels independently; a cross-head pivotally attached to the turn-table; brake-shoes carried by the turn-table and movable into and out of contact with its annular support; connections between the cross-head and the brake-shoes; a crank-shaft provided with a cranked portion; and a connection between said cranked portion of the shaft and the cross-head pivoted to the turn-table and also between said shaft and the brake-shoes or holding devices, adapted to permit either brake to be thrown into clamping action without affecting the other brake, substantially as set forth.

9. In combination with a vehicle, front and rear ground-wheels therefor; a motor connected with and serving to positively and independently rotate the front wheels; and brakes or holding devices adapted and arranged to brake or hold either front wheel at will, whereby the other is adapted to circle about the retarded wheel by reason of the power applied to the driven wheel, and thus to turn the vehicle or change the direction of its movement.

10. In combination with a vehicle, front and rear ground-wheels therefor; a turn-table interposed between the front wheels and the vehicle-body; a motor serving to positively and independently rotate said front wheels; brakes or holding devices adapted and arranged to brake or hold either driven wheel at will; and means for locking the turn-table against turning relatively to the vehicle-body.

11. In a vehicle, the combination with a body and rear supporting-wheels, of a forward truck swiveled in or rotatable relatively to said body and provided with ground-wheels; a motor serving to positively and independently rotate the wheels of said truck; and brakes or holding devices adapted and arranged to brake or hold either of said ground-wheels at will, and permit the other to circle about it under the power of the motor.

In testimony whereof I have signed my name to this specification in the presence of two subscribing witnesses.

WARREN S. JOHNSON.

Witnesses:
HENRY J. MENGEL,
CLIFFORD A. LOEW.